United States Patent
Gibson

(10) Patent No.: US 6,873,749 B2
(45) Date of Patent: Mar. 29, 2005

(54) OPTICAL DEVICES

(75) Inventor: Gary Gibson, Lanchester (GB)

(73) Assignee: JDS Uniphase Corporation, San Jose, CA (US)

( * ) Notice: Subject to any disclaimer, the term of this patent is extended or adjusted under 35 U.S.C. 154(b) by 88 days.

(21) Appl. No.: 10/302,052

(22) Filed: Nov. 22, 2002

(65) Prior Publication Data

US 2003/0156474 A1 Aug. 21, 2003

Related U.S. Application Data

(60) Provisional application No. 60/333,801, filed on Nov. 28, 2001.

(30) Foreign Application Priority Data

Feb. 6, 2002 (GB) .............................. 0202738

(51) Int. Cl.$^7$ .............................................. G02F 1/035
(52) U.S. Cl. .......................................... 385/2; 385/129
(58) Field of Search ....................... 385/2, 40, 129–131

(56) References Cited

U.S. PATENT DOCUMENTS 5,404,412 A * 4/1995 Seino et al. .................... 385/2
5,615,039 A * 3/1997 Henley ........................ 359/257
6,493,497 B1 * 12/2002 Ramdani et al. ............ 385/131

FOREIGN PATENT DOCUMENTS

EP    0 650 829 A1    10/1994    ........... B32B/27/06

* cited by examiner

*Primary Examiner*—Michael G. Lee
*Assistant Examiner*—Jamara A. Franklin
(74) *Attorney, Agent, or Firm*—Allen, Dyer, Doppelt Milbrath & Gilchrist, P.A.

(57) ABSTRACT

The present invention relates to optical devices and, more particularly, to optical waveguide devices in which characteristics of a light signal are modulated or changed in accordance with an applied electric field. Conventionally, in such devices, such as, for example, a Mach-Zehnder modulator, DC drift problems, as are well known within the art, must be surmounted if the optical device is to meet minimum performance criteria. Suitably the present invention provides a layer of an oxide of silicon, preferably substantially, free of metallic impurities, where the ratio of oxygen to silicon is greater than 2 and is preferably greater than or equal to 2.2.

8 Claims, 6 Drawing Sheets

OPTICAL DEVICES

CROSS-REFERENCE TO RELATED APPLICATIONS

This application claims priority of U.S. Provisional Patent Application No. 60/333,801 filed on Nov. 28, 2001, and United Kingdom Patent Application No: 0202738.1 filed on Feb. 6, 2002 which is incorporated herein by reference for all purposes

FIELD OF THE INVENTION

The present invention relates to optical devices and methods of manufacture thereof and, more particularly, to optical waveguide devices and associated methods of manufacture.

BACKGROUND TO THE INVENTION

Conventionally, an RF field is applied to an optical device in the region of a waveguide so as to change the refractive index of the waveguide to bring about modulation in intensity and/or phase of any light being carried within that waveguide.

The modulating RF electric field is usually applied via an electrode formed on a buffer layer covering a substrate surface on which the waveguide has been prepared. The buffer layer typically comprises a dielectric film that has a refractive index that is smaller than that of the waveguide. One of the functions of the buffer layer is to reduce optical losses that are due to absorption within the metallic electrodes. Another function of the buffer layer is to obtain velocity matching between the microwave (RF) propagating within the electrode and the light propagating within the waveguide.

Examples of optical waveguide devices that use an electro-optical crystal substrate, such as, for example lithium niobate ($LiNbO_3$), are Mach-Zehnder interferometric modulators, electro-optical polarisation controllers, variable optical attenuators and electro-optic switches.

Within, for example, the Mach-Zehnder modulator the relative optical path lengths of two signals derived from a single optical signal are varied as a result of refractive index changes in corresponding waveguides in response to an applied RF field to produce, upon recombination, either constructive or destructive interference according to the relative phases of the two optical signals.

A state of a preferred phase difference, which is changeable with temperature and time, is controlled by a simultaneous application of a DC bias voltage via an appropriate electrode structure. It is well known within the art that a DC bias may be required to ensure stable operation of the device even in an ordinary service atmosphere. Accordingly, many optical devices employ DC bias voltage feedback control circuits in an attempt to maintain a stable optical output signal.

The variation in the DC bias voltage as a result of the DC bias voltage feedback control is known within the art as the DC drift of the device. Indeed, a quality specification imposed upon such devices is that the applied DC bias should remain within predetermined limits over a 25-year period.

U.S. Pat. No. 5,404,412, assigned to Fujitsu Limited, discloses an optical device having reduced DC drift, that is, having an arrangement for maintaining the DC bias voltage to within predetermined limits. U.S. Pat. No. 5,404,412 addresses the confinement of DC drift by using a buffer layer that is a transparent dielectric or insulator. The layer is formed from a mixture of silicon dioxide, an oxide of at least one element selected from the group consisting of the metal elements of Groups III to VIII, Ib and IIb of the periodic table and semi-conductor elements other than silicon. For example, an embodiment of U.S. Pat. No. 5,404,412 discloses a buffer layer comprising silicon dioxide ($SiO_2$) containing a 5 mol. % of $In_2O_3$ and a 5 mol. % of $TiO_2$, that is, the buffer layer consists of a composition $(SiO_2)_{0.95}$—$(TiO_2)_{0.05}$ as a base that also contains a 5 mol. % of $In_2O_3$. It has been found that the DC drifts of waveguide devices having such a buffer layer are within acceptable parameters.

However, it will be appreciated that the manufacture of a buffer layer having such a complex composition is a relatively complex and expensive procedure. The accurate control of the chemical composition of such complex oxide materials in the form of a film (i.e. the buffer layer) is very difficult because of, for example, the different volatile temperatures and pressures of the source materials, and the differences in suitable film deposition conditions being depending on materials, etc.

Therefore, it is an object of the present invention at least to mitigate some of the problems associated with the prior art.

SUMMARY OF THE INVENTION

Accordingly, a first aspect of the present invention provides an optical device comprising a substrate bearing an optical waveguide, a buffer layer, and electrodes formed on the buffer layer for influencing an optical field within the waveguide in response to an applied electric field; the buffer layer being formed of $SiO_x$ such that $x>2$ and preferably $x \geq 2.2$.

It has been found that by increasing the oxygen stoichiometry of $SiO_x$ to the proportions indicated above advantageously confines the DC drift to within acceptable parameters.

Notably, beyond $x=2$, the DC drift rate has been found to decrease to levels that are lower than those of a conventional device with an $SiO_2$ buffer layer, and reach a level comparable to the intrinsic drift of the substrate itself at $x=2.2$.

Advantageously, the improvement in performance of the optical devices of the present invention follows at least in part by suppressing the rate of the non-zero DC drift behaviour of the device, which is due to imperfect electrical insulation characteristics of device constituent materials.

Preferably, the optical device is an electro-optical polarisation controller or an optical modulator such as, for example, a Mach-Zehnder optical intensity modulator, a variable optical attenuator or an electro-optic switch.

A second aspect of the present invention provides a method of fabricating a buffer layer for an optical device; the method comprising the substantially simultaneous steps of evaporation deposition, ion plating or sputtering deposition of an oxidised silicon film on the substrate in a relative vacuum atmosphere, flowing a gas mixture including at least $O_2$ onto the substrate surface, and ionising the flowing gas mixture by application of a bias voltage to the gas mixture. The main aim of the fabrication method is to achieve a chemical composition of the deposited $SiO_x$ film where the oxygen is controlled to be $x>2$ and preferably $x \geq 2.2$ by adjusting the gas mixture flow rate to achieve at least one desired partial pressure and/or the applied bias voltage.

Embodiments preferably provide a layer of an oxide of silicon substantially free of metallic impurities except for elements constituting the substrate material.

Preferably, embodiments provide a layer in which the ratio of silicon to oxygen is such that $SiO_x$ is formed where x>2.

Preferably, embodiments are provided in which the buffer layer comprises silicon and oxygen in non-stoichiometric quantities, that is in a hyper-oxygen condition. Preferred embodiment are substantially free from intentional doping of other elements, in particular, metal elements.

To avoid inherent problems associated with the use of a complex buffer layer material, such as metal-doped $SiO_2$, the present invention advantageously, uses simple silicon oxides as the buffer layer, which have a preferred Si/O ratio to provide a reduced DC drift.

A third aspect of the present invention provides a method of fabricating a buffer layer for an optical device; the method comprising the step of depositing silica on a substrate in the presence of an activated or ionised flowing gas mixture comprising $O_2$ such that the buffer layer comprises an $SiO_x$ film where x>2.

BRIEF DESCRIPTION OF THE DRAWINGS

Embodiments of the present invention will now be described, by way of example only, with reference to the accompanying drawings in which.

DESCRIPTION OF THE PREFERRED EMBODIMENTS

Figure 1:
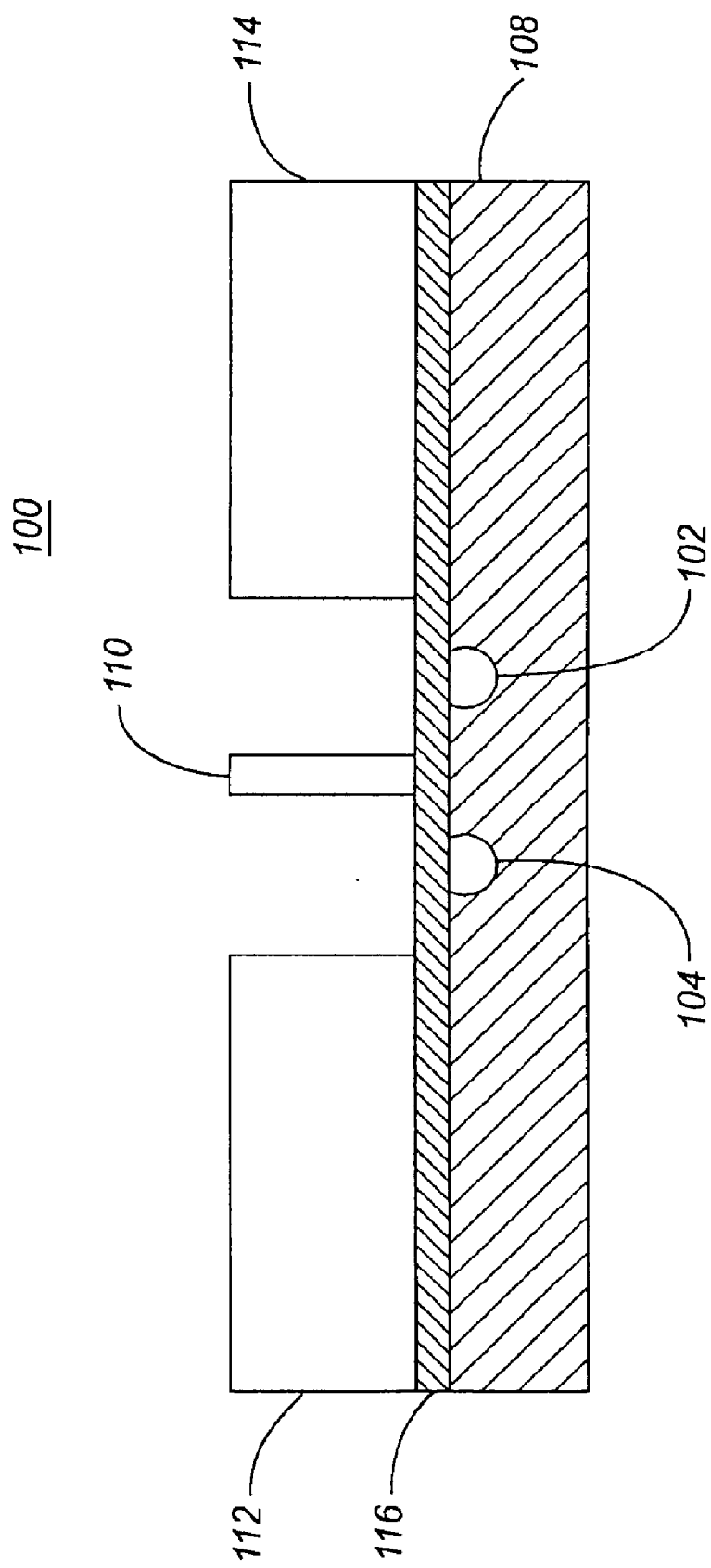
FIG. 1 depicts schematically a cross-sectional view of a Mach-Zehnder modulator.

Referring to FIG. 1, there is shown a schematic cross-sectional view 100 of a Mach-Zehnder modulator. The waveguide arms 102 and 104 are formed in an electro-optical crystal substrate 108 such as, for example, x-cut or y-cut lithium niobate, by titanium diffusion. An input optical waveguide (not shown in FIG. 1) divides a received optical signal into the waveguide arms 102 and 104. An RF signal electrode 110 is disposed between the two waveguide arms 102 and 104. The modulator 100 also comprises outer ground electrodes 112 and 114 that, in use, form a push-pull arrangement to modulate the phase of the light propagating in the waveguide arms 102 and 104. Recombining the phase modulated optical signal, via an output waveguide, results in an intensity-modulated light signal from the output waveguide portion (not shown). Disposed beneath the signal 110 and ground electrodes 112 and 114 is a buffer layer 116.

In the Mach-Zehnder modulator 100 shown, a DC bias-application portion (not shown), which controls a state of output intensity modulation, has a similar cross-sectional structure. A DC bias voltage is supplied by the RF signal electrode 110. However, in conventional x-cut and y-cut lithium niobate Mach-Zehnder modulators, the buffer layer 116 is commonly removed from the substrate surface to prevent a large de drift of the output light signal due to a large reduction of the applied DC voltage through the buffer layer. This means that the electrodes in x-cut and y-cut lithium niobate modulators are realised using an RF signal electrode with a corresponding buffer layer and a DC bias portion without a DC buffer layer. For embodiments that use a z-cut lithium niobate as the substrate for Mach-Zehnder modulator device, because the electrodes are usually disposed over the waveguides to obtain the most effective push-pull arrangement, the buffer layer that has the function of reducing, and preferably minimising, absorption of the light by the metallic electrode, can not be removed from the substrate surface; i.e. a buffer layer in accordance with the present invention to suppress DC drift is used.

To demonstrate clearly an effect of the present invention, embodiments of an x-cut lithium niobate Mach-Zehnder modulators were tested. An $SiO_x$ buffer layer with various stoichiometries, including the conventional $x \leq 2$ and the x>2 of the present invention, were deposited on x-cut lithium niobate substrates (wafer) surfaces having Ti-diffused waveguides. Preferably, Mach-Zehnder modulator embodiments had the RF electrode portion and the DC bias electrode portion in series on the same Mach-Zehnder waveguide structure. A reference embodiment of a common x-cut lithium niobate Mach-Zehnder modulator comprising an RF portion with an $SiO_2$ buffer layer and a DC bias portion without a buffer layer was also realised.

The buffer layers of the embodiments of the present invention were formed from $SiO_x$, where x is greater than 2. In preferred embodiments, x is, at least, greater than or equal to 2.2.

Preferably, the buffer layers of the embodiments of the present invention are fabricated using a silicon oxide film deposition apparatus installed with a chemically reactive gas supply system such as an Advanced Plasma Source (APS) e-beam system. To control oxygen stoichiometry of the $SiO_x$ film, the biasing voltage of the deposition apparatus was varied. The biasing voltage ionises a part of the supplied gases, which flow towards a substrate during deposition.

In preferred embodiments, using this deposition apparatus, the oxygen flow rate is also varied. Preferably, an inert gas is mixed with the oxygen, during the fabrication of the embodiments, to vary an ionisation state, that is, the degree of ionisation, of oxygen and a reaction process between silicon and oxygen. Pure silica was used as an e-beam evaporation source.

Table 1 below shows the prevailing fabrication conditions for the above embodiments in accordance with the present invention.

TABLE 1

| Wafer | $O_2$ flow rate/sccm | Ar flow rate/sccm | Bias voltage/v |
|---|---|---|---|
| Sample 1 (8772) | 40 | 14 | 150 |
| Sample 2 (9211) | 35 | 14 | 110 |

Figure 2:
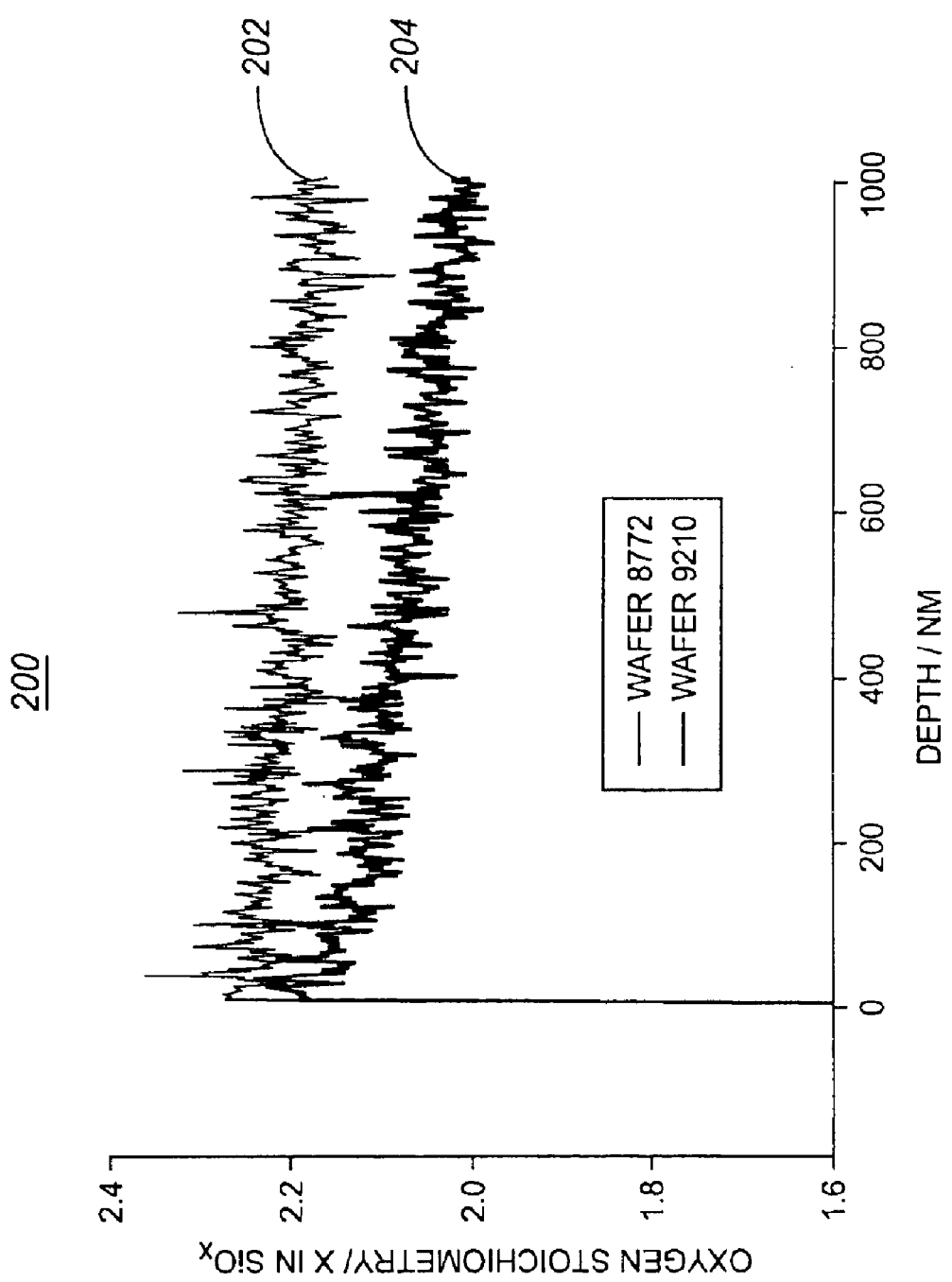
FIG. 2 shows a graph of the variation of oxygen stoichiometry with buffer layer depth for embodiments.

Referring to FIG. 2, there is shown a graph 200 of the variation in oxygen stoichiometry as a function of layer depth for the samples listed in Table 1. The oxygen stoichiometry was determined using secondary ion mass spectrometry (SIMS). The second sample (9211) 202 exhibits a lower variation in oxygen stoichiometry with buffer layer depth as compared to the first (8772) 204 sample. It can be appreciated that an oxygen stoichiometry of x slightly greater than 2 (about 2.07 on average) for sample 1 was realised and, in the case of sample 2, x was equal to 2.2 and, in some instances, was greater than 2.2.

Figure 3:
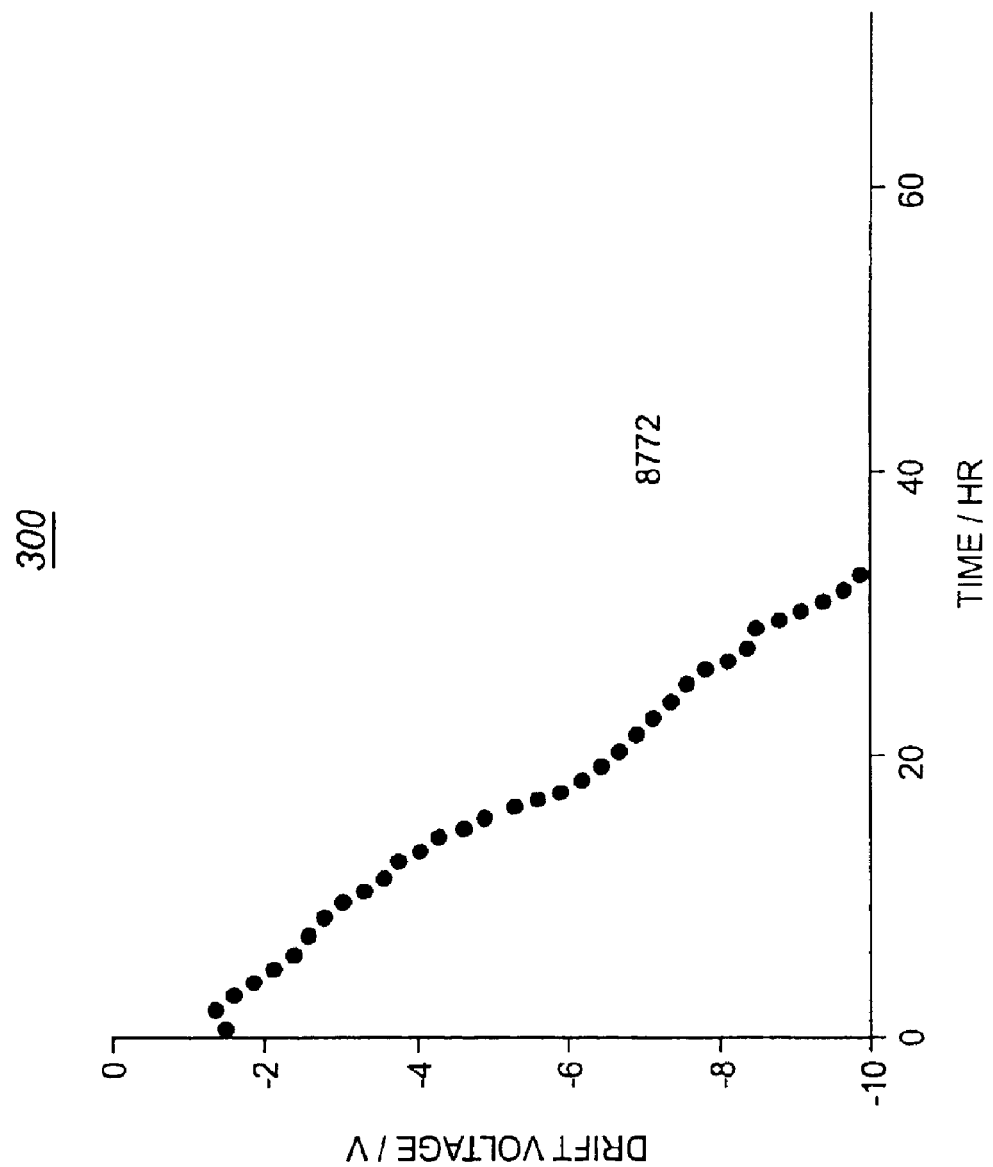
FIG. 3 shows a first graph of the variation of DC bias voltage with time (DC drift) for an embodiment with an $SiO_x$ buffer layer, where x is about 2.04.
Figure 4:
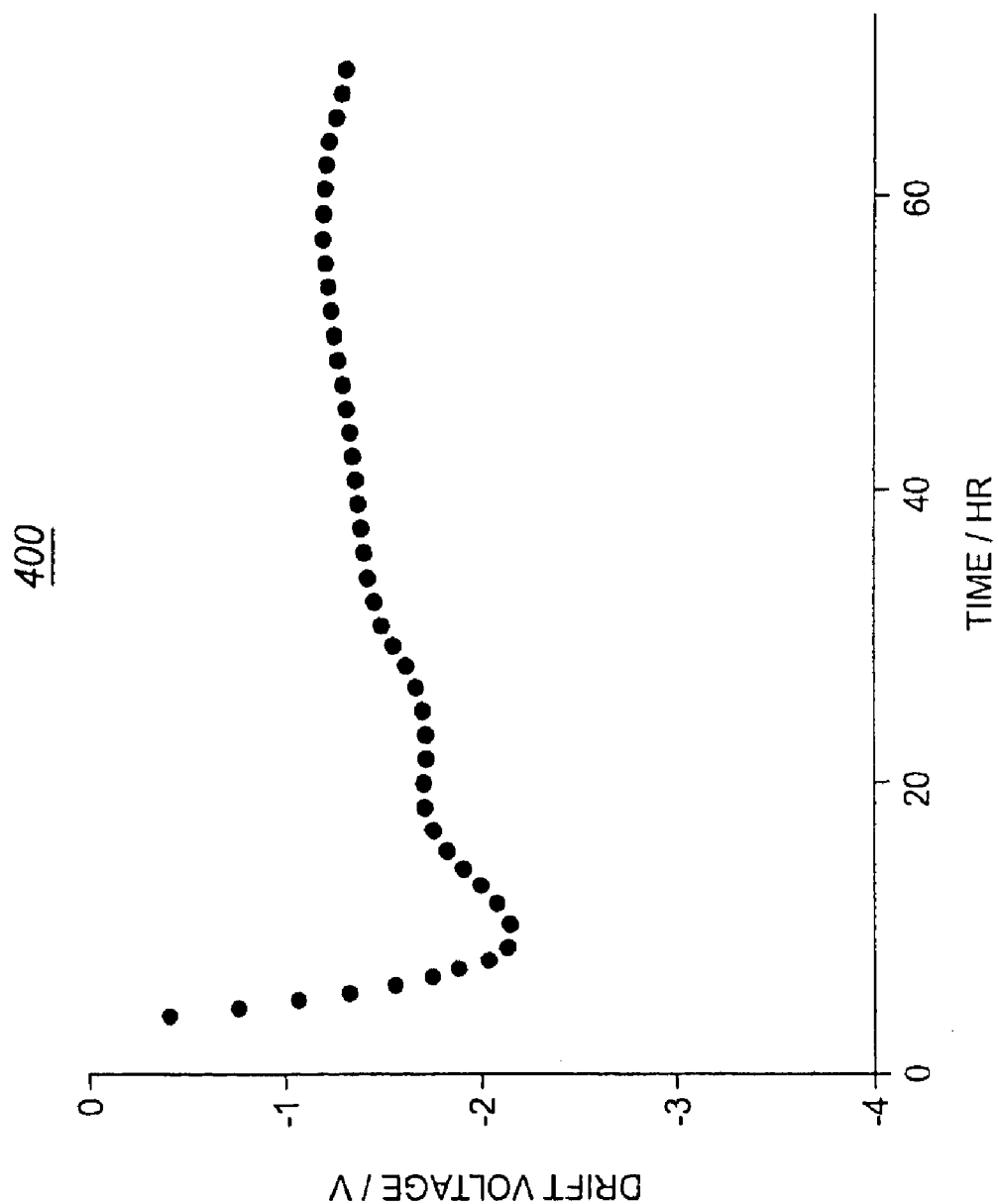
FIG. 4 shows a second graph of the variation of the DC bias voltage with time (DC drift) for an embodiment with an $SiO_x$ buffer layer, where $x \geq 2.2$.

FIGS. 3 and 4 show graphs 300 and 400 respectively of DC drift performance as a function of time, measured at 80° C., for the modulator embodiments having $SiO_x$ buffer layers formed under the conditions of Table 1. While applying an AC electrical signal to the RF port of the modulator, the DC bias voltage applied to the DC bias port, was controlled, in a feed-back control manner, to track the optical output intensity at a pre-set state, that is, the modulation quadrature point. It can be appreciated that the embodiments exhibited substantially linear drift behaviour. The DC drift rate was calculated for these embodiments.

Similar measurements and calculations of DC drift rate were carried out for other modulators, in which the $SiO_x$ stoichiometry was such that x<2. The oxygen stoichiometry of the buffer layers of the other modulators was controlled using the same deposition system (APS) or using other film deposition systems such as plasma enhanced chemical vapour deposition (PECVD) system and ion assisted deposition (IAD) system. In the case of APS, for example, by setting the biasing voltage at 130 V, $O_2$ flow rate at 15 sccm, and Ar flow rate at 14 sccm, $SiO_x$ films were obtained with $1.74 \leq x \leq 1.82$.

Figure 5:
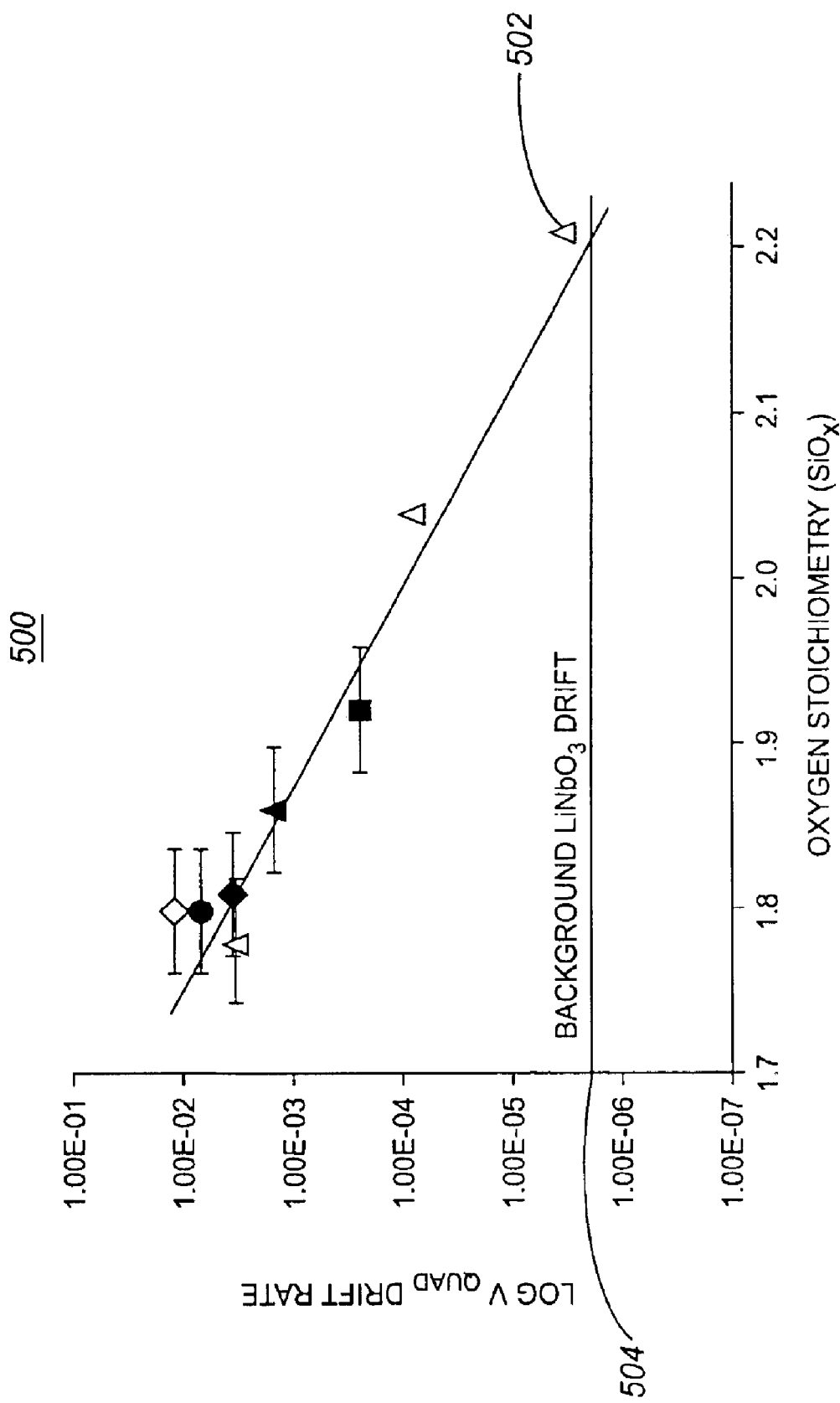
FIG. 5 depicts a log-linear relationship between the DC drift rate and the oxygen stoichiometry of the buffer layers for various embodiments of the present invention and for prior art devices.

FIG. 5 shows a graph 500 that summarises the relationship between measured DC drift rate (log-scale) and oxygen stoichiometry (measured by SIMS). The DC drift rate of the reference x-cut lithium niobate modulator without a buffer layer is shown as the "background" drift 502. It can be appreciated that the DC drift reduces substantially exponentially with increasing oxygen stoichiometry. It can be seen from FIG. 5 that the DC drift rate of one 504 of the embodiments, with an $SiO_x$ buffer layer, where $x \geq 2.2$, is almost the same as the background drift rate ($2 \times 10^{-6}$ V/s), indicating that the present invention is effective in addressing the DC drift problem of lithium niobate modulators with buffer layers.

Although the above embodiments have been described with reference to the fabrication of a Mach-Zehnder optical modulator, the present invention is not limited thereto. Embodiments can be realised in which the $SiO_x$ buffer layer film is deposited on other devices such as integrated devices and/or electro-optical polarisation controllers, electro-optical switches, variable optical attenuators, etc. Indeed, embodiments of the present invention may find application in any technological field that requires a DC stable dielectric layer.

Figure 6:
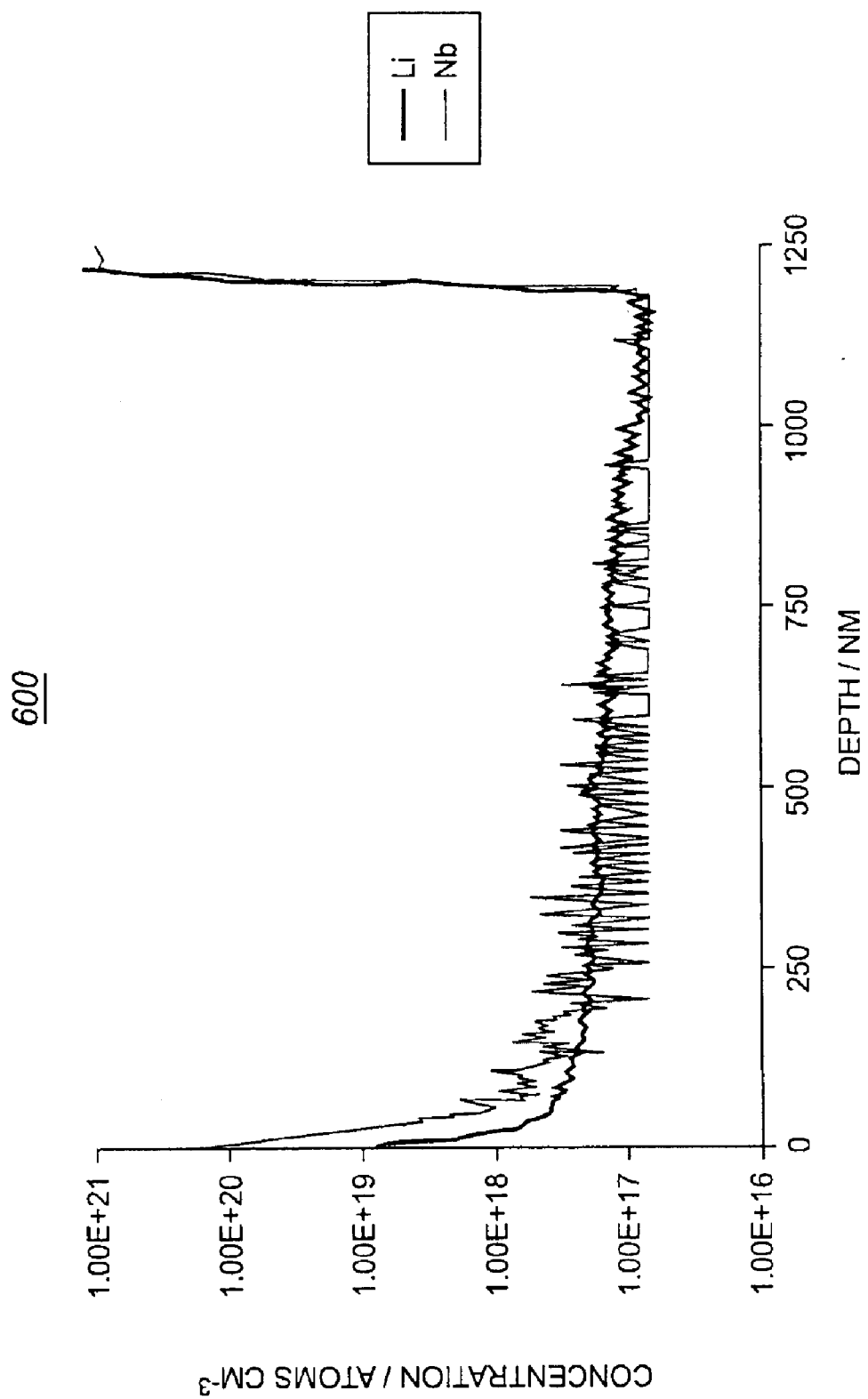
FIG. 6 shows a graph of the variation of impurities with buffer layer depth for an embodiment.

Without wishing to be bound by any particular theory, in considering a physical mechanism underlying the DC drift reduction exhibited by embodiments of the present invention, it can be appreciated from the graph 600 of FIG. 6, which shows a SIMS analysis of the variation of Li and Nb ion concentration with buffer layer depth, that Li exists in the deposited silicon oxide buffer film as an impurity diffused from the lithium niobate substrate. A suppressed $Li^+$ ion-migration in the silicon hyper-oxide film may explain the DC drift reduction of the embodiments of the present invention. Chemically reactive dangling-bonds of excess oxygen in the silicon hyper-oxide may trap cation-carriers such as $Li^+$, $H^+$, which substantially reduces, and preferably minimises, their migration between electrodes.

It will be appreciated that the present invention is equally applicable to the various orientations of the lithium niobate crystal substrate, that is, to x-, y- and z-cut substrates, and also to other kinds of electro-optical substrates such as polarised amorphous materials, electro-optic polymers, semiconductors, etc.

Furthermore, the embodiments of the invention are not limited to the processing conditions illustrated in Table 1. One skilled in the art appreciates that other combinations of those processing conditions may also result in $SiO_x$ having the appropriate DC stability qualities as the specifically described embodiments.

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

What is claimed is:

1. An optical device comprising a substrate bearing an optical waveguide, a buffer layer, and at least one electrode formed on the buffer layer for influencing an optical field within the waveguide in response to an applied electric field; the buffer layer being formed of $SiO_x$ such that x>2.

2. An optical device as claimed in claim 1, in which $x \geq 2.2$.

3. An optical device as claimed in claim 1, in which the buffer layer is substantially free from intentional doping with metallic ions.

4. An optical device as claimed in claim 1, in which the substrate is composed of lithium niobate.

5. An optical device as claimed in claim 1, in which the optical device is an electro-optical polarisation controller.

6. An optical device as claimed in claim 1, in which the optical device is an optical modulator comprising at least one Mach-Zehnder interferometer.

7. An optical device as claimed in claim 1, in which the optical device is an electro-optical switch.

8. An optical device as claimed in claim 1, in which the optical device is a variable optical attenuator.

* * * * *